(12) United States Patent
Wang et al.

(10) Patent No.: US 11,014,131 B2
(45) Date of Patent: *May 25, 2021

(54) EDGE POSITIONING APPARATUS FOR SOLAR PANEL CLEANING ROBOT, AND POSITIONING METHOD THEREOF

(71) Applicant: SUZHOU RADIANT PHOTOVOLTAIC TECHNOLOGY CO., LTD, Jiangsu (CN)

(72) Inventors: Zhixiang Wang, Jiangsu (CN); Jianrong Xu, Jiangsu (CN); Fei Xu, Jiangsu (CN)

(73) Assignee: SUZHOU RADIANT PHOTOVOLTAIC TECHNOLOGY CO., LTD, Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/611,497

(22) PCT Filed: Apr. 4, 2018

(86) PCT No.: PCT/CN2018/081991
§ 371 (c)(1),
(2) Date: Nov. 7, 2019

(87) PCT Pub. No.: WO2019/076005
PCT Pub. Date: Apr. 25, 2019

(65) Prior Publication Data
US 2020/0238348 A1 Jul. 30, 2020

(30) Foreign Application Priority Data
Oct. 20, 2017 (CN) .......................... 201710981171.0

(51) Int. Cl.
*B08B 13/00* (2006.01)
*G06T 7/13* (2017.01)
(Continued)

(52) U.S. Cl.
CPC ............ *B08B 13/00* (2013.01); *B25J 9/1666* (2013.01); *B25J 11/0085* (2013.01);
(Continued)

(58) Field of Classification Search
CPC ...... B25J 9/1666; B25J 9/1667; B25J 19/023; B25J 13/089; B25J 11/0085;
(Continued)

(56) References Cited

U.S. PATENT DOCUMENTS

| | | | |
|---|---|---|---|
| 9,020,636 B2 * | 4/2015 | Tadayon | F24S 25/70 700/247 |
| 9,411,338 B2 | 8/2016 | Hanaoka et al. | |

(Continued)

FOREIGN PATENT DOCUMENTS

| | | |
|---|---|---|
| CN | 102773862 A | 11/2012 |
| CN | 107553497 A | 1/2018 |

(Continued)

*Primary Examiner* — Brian P Yenke
(74) *Attorney, Agent, or Firm* — Mark M. Friedman

(57) ABSTRACT

An edge positioning apparatus for a solar panel cleaning robot, and a positioning method thereof. The solar panel cleaning robot comprises a car body (10) and an edge positioning apparatus, and the car body travels or is resident on at least one solar panel (200). The edge positioning apparatus comprises an image acquisition unit (13) and an image recognition and processing unit. The image acquisition unit is arranged on the car body and is used for acquiring surface image information about the solar panel on a walking line of the car body. The image recognition and processing unit is used for processing image information, and in turn judging whether the car body is walking at an edge area of the solar panel.

18 Claims, 2 Drawing Sheets

(51) Int. Cl.
  *G06K 9/00*  (2006.01)
  *B25J 9/16*  (2006.01)
  *B25J 11/00*  (2006.01)

(52) U.S. Cl.
  CPC ............ *G06K 9/00664* (2013.01); *G06T 7/13* (2017.01); *G06T 2207/30252* (2013.01)

(58) Field of Classification Search
  CPC ........ G05D 1/0246; G05B 2219/40507; G06T 7/13; G06T 2207/30252; G06K 9/00664
  See application file for complete search history.

(56) References Cited

U.S. PATENT DOCUMENTS

| | | | |
|---|---|---|---|
| 9,435,911 B2* | 9/2016 | Yu | G06T 7/579 |
| 9,457,463 B2* | 10/2016 | Tadayon | F24S 50/20 |
| 9,504,367 B2 | 11/2016 | Kim et al. | |
| 9,704,043 B2* | 7/2017 | Schnittman | B25J 5/00 |
| 9,931,011 B2 | 4/2018 | Kim et al. | |
| 10,133,278 B2* | 11/2018 | Shin | G06K 9/00664 |
| 10,275,649 B2* | 4/2019 | Shin | G05D 1/0272 |
| 10,307,910 B2* | 6/2019 | Shin | G05D 1/0253 |
| 10,311,544 B2* | 6/2019 | Kuang | G06T 7/60 |
| 10,349,794 B2 | 7/2019 | Watanabe et al. | |
| 10,399,228 B2* | 9/2019 | Shin | G06K 9/4609 |
| 10,442,083 B2* | 10/2019 | Wolowelsky | G05D 1/0221 |
| 10,511,256 B2* | 12/2019 | Jiang | F24S 40/20 |
| 10,583,561 B2* | 3/2020 | Suvarna | B25J 11/0085 |
| 10,802,500 B2* | 10/2020 | Peng | H02S 40/10 |
| 2015/0272413 A1* | 10/2015 | Miyake | F24S 40/20 701/23 |
| 2015/0366130 A1* | 12/2015 | Bergstrom | B62D 11/001 701/23 |
| 2016/0368135 A1* | 12/2016 | Tadayon | B25J 5/00 |
| 2017/0157775 A1* | 6/2017 | Miyake | A47L 9/2852 |
| 2017/0194898 A1 | 7/2017 | Meller et al. | |
| 2018/0050450 A1* | 2/2018 | Parrott | B25J 9/0084 |
| 2018/0241343 A1 | 8/2018 | Jiang et al. | |
| 2018/0369874 A1* | 12/2018 | Jiang | B08B 13/00 |
| 2019/0133402 A1* | 5/2019 | Xie | G05D 1/0242 |
| 2019/0314991 A1* | 10/2019 | Liu | B25J 9/1666 |
| 2020/0012291 A1* | 1/2020 | Peng | B25J 9/1664 |
| 2020/0012292 A1* | 1/2020 | Park | G06K 9/00664 |
| 2020/0016751 A1* | 1/2020 | Park | A47L 9/2805 |
| 2020/0019779 A1* | 1/2020 | Maeng | B25J 11/008 |
| 2020/0039074 A1* | 2/2020 | Jeong | B25J 11/0005 |
| 2020/0114517 A1* | 4/2020 | Wang | A47L 9/30 |
| 2020/0125116 A1* | 4/2020 | Wang | B25J 9/1666 |
| 2020/0134314 A1* | 4/2020 | Hu | G06K 9/00805 |
| 2020/0169215 A1* | 5/2020 | Peng | H02S 40/10 |
| 2020/0215694 A1* | 7/2020 | Song | G06K 9/00664 |
| 2020/0275605 A1* | 9/2020 | Chen | G05D 1/0278 |
| 2020/0358966 A1* | 11/2020 | Lee | G06T 7/11 |

FOREIGN PATENT DOCUMENTS

| | | |
|---|---|---|
| CN | 106269624 | 3/2019 |
| JP | 2014194729 A | 10/2014 |
| JP | 2015013281 A | 1/2015 |
| JP | 2016051343 A | 4/2016 |
| KR | 20160033615 A | 3/2016 |
| WO | 2015076593 A1 | 5/2015 |
| WO | 2017118973 A1 | 7/2017 |

\* cited by examiner

EDGE POSITIONING APPARATUS FOR SOLAR PANEL CLEANING ROBOT, AND POSITIONING METHOD THEREOF

BACKGROUND OF DISCLOSURE

1. Field of Disclosure

The present disclosure relates to cleaning robot fields, and more particularly, to an edge-positioning apparatus for a solar panel cleaning robot and a positioning method thereof.

2. Description of Related Art

As fossil fuels are in a decline, new renewable solar energy has become an important part of energy used by humans, as solar energy technology has been rapidly developed in all countries in the world over the past decade. A solar panel refers to a device that converts solar energy directly into electrical energy using semiconductor materials that generate photovoltaic (PV) effect when exposed to sunlight. The solar panels are suitable for applications ranging from large power stations to small portable chargers. In recent years, the solar panels have had rapid development.

Work environment of the solar panels can only be outdoors, where a biggest problem affecting their work is not thunderstorms, but dust that has accumulated over the years. The dust or other adhesion attached to the solar panel may affect light transmittance of the panel and limit photoelectric efficiency, which will seriously affect efficiency of the panel directly obtaining the sunlight, reduce panel energy absorption and conversion efficiency, and reduce power generation efficiency. Conventional solar panels in use can only rely on regular completion of manual cleaning work. Because of larger solar panels, large power stations use more panels at the same time, dust will be accumulated repeatedly, and repeated cleaning is required. Therefore, labor costs are high, cleaning efficiency is low, and cleaning effect is poor. In many occasions, in order to improve space utilization rate, solar panels are set in high places by mounting brackets, which brings more difficulty and risks for cleaning. In order to reduce cleaning costs, many users of the solar panels can only choose not to clean, and therefore can only be forced to bear the power loss caused by dust. Thus, a new automatic cleaning device is needed for automatic cleaning the solar panels.

For this, with reference to related content specifically disclosed in a China patent application No. 201610836028.8, a novel cleaning robot is developed to clean the solar panels. However, with continuing practical use of the cleaning robot, research for novel functions is required to overcome various practical problems.

For example, as there exist edges on a solar panel and when a cleaning robot cleans on the edges but doesn't immediately find out the edges of the solar panel where it is located, the cleaning robot may fall down accidentally due to a problem of path planning. As the solar panel may be set high and if the cleaning robot falls down from the solar panel, the body of the cleaning robot may be damaged, incurring a certain loss of economy.

Therefore, it is necessary to develop a novel edge-positioning apparatus for a solar panel cleaning robot to overcome deficiencies in conventional technologies.

SUMMARY

An object of the present disclosure is to provide an edge-positioning apparatus for a solar panel cleaning robot to solve a problem that conventional cleaning robots fail to be immediately positioned on edges of a solar panel.

In order to solve the above problems, the present disclosure provides an edge-positioning apparatus for a solar panel cleaning robot. The solar panel cleaning robot includes a vehicle body configured to move or stop on at least one solar panel. The solar panel is rectangular in shape. Four frame lines is disposed on edges of the solar panel. Lines of latitude and lines of longitude perpendicular to one another are disposed in the solar panel. A width of each frame line is greater than a width of each line of latitude and is greater than a width of each line of longitude. The edge-positioning apparatus includes an image capturing unit and an image recognizing processing unit. The image capturing unit is disposed on the vehicle body and is configured to capture image information on a surface of the solar panel on a route of the vehicle body, and to transmit the image information to the image recognizing processing unit. After receiving the image information on the surface of the solar panel, the image recognizing processing unit captures target-line information in the image information on the surface, then compares the captured target-line information with predetermined data, and judges whether the vehicle body travels in edge regions of the solar panel according to a comparison result.

Further, in other embodiments, the image information on the surface of the solar panel includes line information on the lines of latitude, the lines of longitude, or the frame lines. The captured target-line information is the line information in the image information. The captured line information is compared with predetermined frame-line data, and if the captured target-line information is equal to or greater than the predetermined frame-line data, a frame line is regarded as being in an image, and thus the vehicle body is judged to travel in the edge regions of the solar panel.

Further, in other embodiments, the captured line information includes at least one of line-width data and line-area data, and the predetermined frame-line data includes at least one of frame-line-width data and frame-line-area data.

Further, in other embodiments, the image capturing unit presets four effective view-finding coordinates before capturing an image, and then captures the image information on the surface of the solar panel within the scope of the four view-finding coordinates.

Further, in other embodiments, the image recognizing processing unit transforms the image into an image with black and white colors after receiving an image transmitted by the image capturing unit, and a line graph in the image is white.

Further, in other embodiments, whether there exists the frame line in the image is judged by the image recognizing processing unit to: compare width data or area data of a continuous white line in the image transformed with width data or area data in the predetermined frame-line data, and if width data of a captured line is equal to the width data in the predetermined frame-line data or if area data of the captured line is equal to or greater than the area data in the predetermined frame-line data, the vehicle body is regarded to travel in the edge regions of the solar panel.

For example, the predetermined frame-line-width data is 25, and the predetermined frame-line-area data is 25×75. Based on the above data, related data of the white line is compared with one or two of the two data, and then the frame line is judged according to a comparison result. The above values are merely for exemplary illustration without any limitation.

Further, in other embodiments, after judging the vehicle body to travel in the edge regions of the solar panel, the image recognizing processing unit calculates distance data from a side border of a captured image of the surface of the solar panel to the frame line recognized, and compares the distance data calculated with a predetermined distance threshold. If the distance data calculated is greater than the predetermined distance threshold, the image recognizing processing unit instructs the vehicle body to move toward the outside of the route until the distance data calculated is equal to the predetermined distance threshold. If the distance data calculated is less than the predetermined distance threshold, the image recognizing processing unit instructs the vehicle body to move toward the inside of the route.

Further, in other embodiments, as the frame line has a certain width, the distance threshold from a side edge of the captured image to the frame line can be set by various methods. For example, the distance threshold can be determined as the distance from the side edge of the captured image to the nearest side edge of the frame line, or the distance threshold can be determined as the distance from the side edge of the captured image to the median line of the frame line, or the distance threshold can be determined as the distance from the side edge of the captured image to the furthest side edge of the frame line.

Further, in other embodiments, the edge-positioning apparatus further includes a light-emitting unit. Light emitted from the light-emitting unit occurs in an image of the surface of the solar panel captured by the image capturing unit. The target-line information is length data of the emitted light in the image information received by the image recognizing processing unit. The image recognizing processing unit compares the length data of the emitted light with predetermined length threshold data, and if the length data of the emitted light is less than the predetermined length threshold data, the vehicle body is regarded to travel in the edge regions of the solar panel. Preferably, the light-emitting unit can be, but not limited to, an infrared-ray emitting unit.

Further, in other embodiments, when judging a length of the emitted light in a received image to be greater than the predetermined length threshold data, the image recognizing processing unit instructs the vehicle body to move toward the outside of the route until the length of the emitted light is equal to the predetermined length threshold data. When the length of the emitted light is less than the predetermined length threshold data, the image recognizing processing unit instructs the vehicle body to move toward the inside of the route.

Further, in other embodiments, an illuminating unit is disposed on the vehicle body and provides illuminating light for the image capturing unit.

Further, in other embodiments, the illuminating unit includes a light-emitting diode (LED) lamp.

Further, in other embodiments, the illuminating unit is disposed behind the image capturing unit.

Further, in other embodiments, the vehicle body includes a housing, a travelling device is disposed at two sides of the vehicle body and is covered with the housing, and an image captured by the image capturing unit includes an image of the surface of the solar panel located between the housing and the travelling device.

Further, in other embodiments, the image capturing unit is disposed between the travelling device and the housing.

Further, in other embodiments, the image capturing unit includes a camera whose a lens is disposed toward the ground.

Further, in another embodiment, the present disclosure provides an edge-positioning method for a solar panel cleaning robot, the edge-positioning method including a panel-image capturing step and an image analysis step. A solar panel where the solar panel cleaning robot is located is rectangular in shape. Four frame lines is disposed on edges of the solar panel. Lines of latitude and lines of longitude perpendicular to one another are disposed in the solar panel. A width of each frame line is greater than a width of each line of latitude and is greater than a width of each line of longitude. The panel-image capturing step includes capturing image information on a surface of the solar panel on a route of a vehicle body of the solar panel cleaning robot; and transmitting the image information on the surface to an image recognizing processing unit of the solar panel cleaning robot. The image analysis step includes capturing target-line information in the image information on the surface after the image recognizing processing unit receives the image information on the surface of the solar panel; comparing the captured target-line information with predetermined data; and then judging whether the vehicle body travels in edge regions of the solar panel according to a comparison result.

Further, in other embodiments, the captured image information on the surface of the solar panel includes line information on the lines of latitude, the lines of longitude, or the frame lines. The captured target-line information is the captured line information in the image information on the surface. The captured line information is compared with predetermined frame-line data, and if the captured target-line information is equal to or greater than the predetermined frame-line data, a frame line is regarded as being in an image of the surface, and thus the vehicle body is judged to travel in the edge regions of the solar panel.

Further, in other embodiments, the captured line information includes at least one of line-width data and line-area data, and the predetermined frame-line data includes at least one of frame-line-width data and frame-line-area data.

Further, in other embodiments, the captured image information on the surface of the solar panel includes emitted light illuminating the solar panel. The emitted light is a target line. The edge-positioning method further includes fetching length data of the emitted light; and comparing the length data of the emitted light with predetermined length threshold data, and if the length data of the emitted light is less than the predetermined length threshold data, the vehicle body is regarded to travel in the edge regions of the solar panel.

Further, in other embodiments, when judging a length of the emitted light in a received image of the surface to be greater than the predetermined length threshold data, the image recognizing processing unit instructs the vehicle body to move toward the outside of the route until the length of the emitted light is equal to the predetermined length threshold data. When the length of the emitted light is less than the predetermined length threshold data, the image recognizing processing unit instructs the vehicle body to move toward the inside of the route.

The advantage of the present disclosure is that, an edge-positioning apparatus for a solar panel cleaning robot and a positioning method thereof are provided to effectively reduce the risk of the cleaning robot falling from a solar panel by comparing width, area, or length data of a recognized line in image information captured with predetermined frame-line data or a distance threshold or a length threshold, and determining whether the cleaning robot is located on the edges of the solar panel according to a comparison result. Therefore, an unnecessary loss of property can be prevented.

Figure 1:
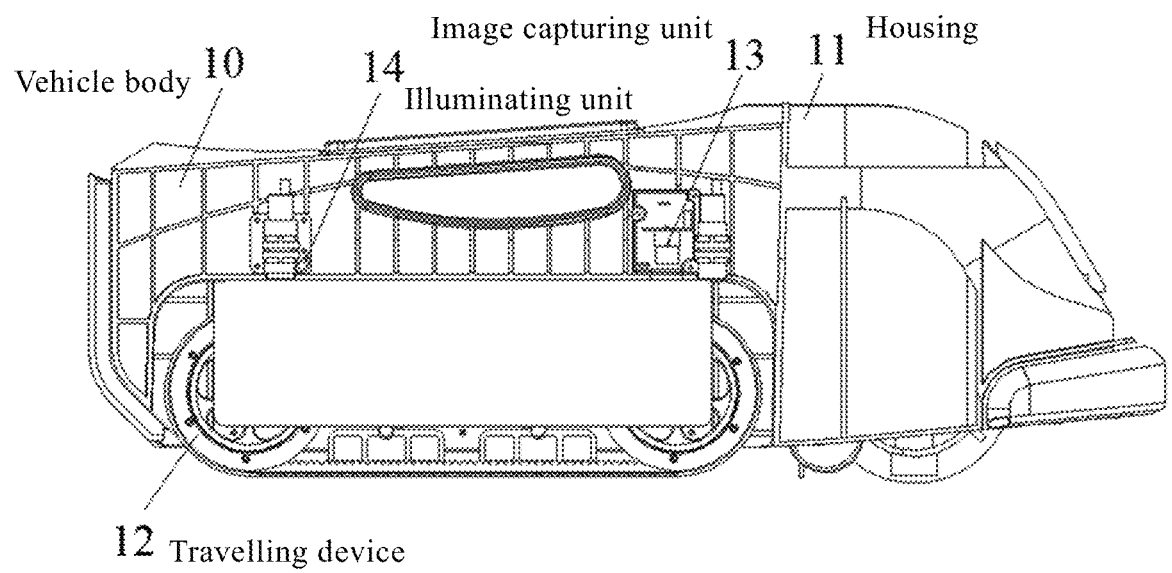
FIG. 1 is a schematic structural diagram of a cleaning robot in an embodiment of the present disclosure and without illustrating a side housing of a vehicle body.

The reference numerals in the figures are as follows: solar panel cleaning robot 100, solar panel 200, frame line 210, line of longitude 211, line of latitude 212, vehicle body 10, housing 11, travelling device 12, image capturing unit 13, illuminating unit 14, infrared-ray emitting unit 15.

DETAILED DESCRIPTION OF EMBODIMENTS

A preferred embodiment of the present invention will be introduced with reference to appended figures as follows to demonstrate that the present invention may be implemented. The embodiment of the present invention can be fully introduced to those skilled in the art to make technical contents clearer and easier to understand. The present invention can be embodied in many different forms of embodiment, and the scope of protection of the present invention is not limited to the embodiments set forth herein.

In the appended figures, structurally identical components are designated by the same reference numerals, and structurally or functionally similar components throughout are designated by similar numerical reference numerals. The dimensions and thicknesses of each component shown in the figures are arbitrarily shown. The size and thickness of each component are not limited, and for the sake of clarity, the thickness of the components is exaggerated somewhat in some places in the figures.

Direction terms mentioned by the present invention, for example "upper", "lower", "front", "rear", "left", "right", "inner", "outer", "side", etc. are merely directions in the appended figures for only explaining and illustrating the present invention but not to limit the protection scope of the present invention.

When some part is described to be "on" another part, the part may be directly disposed on the other part; alternatively, an intervening part may exist, the part is disposed on the intervening part, and the intervening part is disposed on the other part. When a part is described to be "installed on" or "connected to" another part, it may be understood that the parts are directly "installed" or "connected" to each other, alternatively it is understood that one part is "installed" or "connected" to the other part through an intervening part.

The present disclosure provides an edge-positioning apparatus for a solar panel cleaning robot 100. The solar panel cleaning robot 100 includes a vehicle body 10 configured to move or stop on at least one solar panel 200. The solar panel 200 is rectangular in shape. Four frame lines are disposed on edges of the solar panel 200. Lines of latitude and lines of longitude perpendicular to one another are disposed in the solar panel 200. A width of the frame line is greater than a width of each line of latitude and is greater than a width of each line of longitude. The edge-positioning apparatus includes an image capturing unit 13 and an image recognizing processing unit. The image capturing unit 13 is disposed on the vehicle body 10 and is configured to capture image information on a surface of the solar panel 200 on a route of the vehicle body 10, and to transmit the image information to the image recognizing processing unit. After receiving the image information on the surface of the solar panel 200, the image recognizing processing unit captures target-line information in the image information on the surface, then compares the captured target-line information with predetermined data, and judges whether the vehicle body 10 travels in edge regions of the solar panel 200 according to a comparison result.

Further, the captured target line in the image information on the surface of the solar panel can be of a different type. The present disclosure correspondingly provides different technical solutions according to lines of different types.

Specifically, the target line in the image of the surface of the solar panel can be intrinsic line information of the solar panel 200. For example, the width of the frame line 210 is greater than the width of the line of latitude 212 and is greater than the width of the line of longitude 211. Also, as the existence of the frame line 210 shows that the position is located in the edge regions of the solar panel, whether the vehicle body 10 is in the edge regions of the solar panel 200 can be judged by capturing line information on the frame line 210.

Or whether the vehicle body 10 travels in the edge regions of the solar panel 200 can be judged by a change of length of an external line falling on the solar panel 200. Specifically, when the vehicle body 10 travels on the solar panel 200 normally, a length of an external light illuminating the solar panel 200 is constant, and correspondingly, a length of the emitted light in image information on the surface of the solar panel captured by the image capturing unit 13 is constant, too. When the vehicle body 10 travels on the edges of the solar panel 200 and as the vehicle body 10 is located in the edge regions of the solar panel 200, a part of the external emitted light may fall outside the solar panel 200, and correspondingly, the length of the emitted light in image information on the surface of the solar panel captured by the image capturing unit also shortens, so that whether the vehicle body 10 is in the edge regions of the solar panel 200 can be judged.

Further, the above two specific, technical solutions adopted, realizing the same result for judging travel in the edge regions of the solar panel by capturing different line information in image information on the surface of the solar panel, will be detailedly described in conjunction with the accompanying drawings and specific embodiments. A first embodiment will be described in conjunction with FIGS. 1-3, and a second embodiment will be described in conjunction with FIG. 4.

First Embodiment

Figure 2:
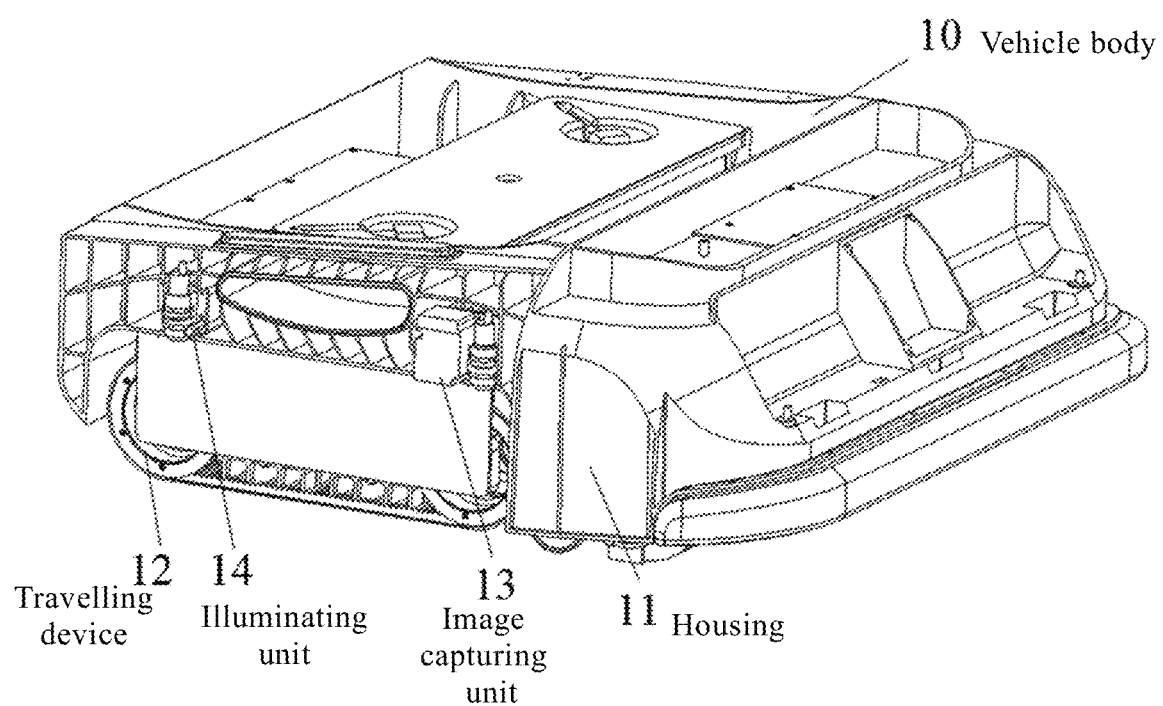
FIG. 2 is a schematic structural diagram of the cleaning robot shown at another angle in FIG. 1.
Figure 3:
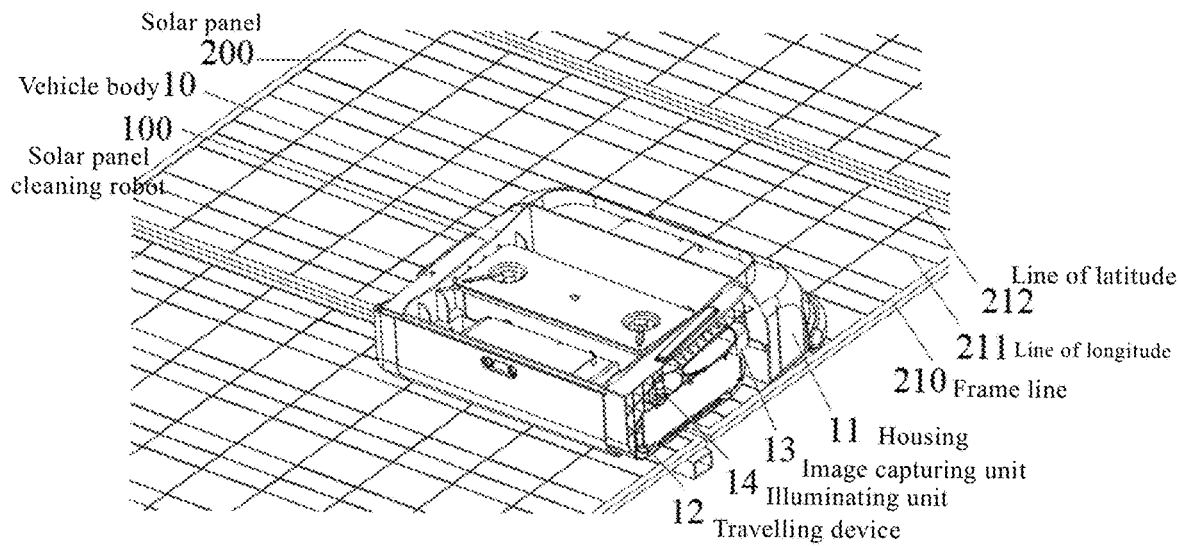
FIG. 3 is a schematic diagram of the cleaning robot, shown in FIG. 1, on a solar panel.

As shown in FIGS. 1-3, the present disclosure provides an edge-positioning apparatus for a solar panel cleaning robot 100. The solar panel cleaning robot 100 includes a vehicle body 10 configured to move or stop on at least one solar panel 200.

The solar panel 200 is rectangular in shape. Four frame lines 210 are disposed on edges of the solar panel 200. Lines of latitude 212 and lines of longitude 211 perpendicular to one another are disposed in the solar panel 200. A width of the frame line 210 is greater than a width of each line of latitude 212 and is greater than a width of each line of longitude 211.

The edge-positioning apparatus includes an image capturing unit 13 and an image recognizing processing unit. The image capturing unit 13 is disposed on the vehicle body 10 and is configured to capture image information on a surface of the solar panel 200 on a route of the vehicle body 10, and to transmit the captured image to the image recognizing processing unit, wherein the image information includes line information on the lines of latitude 212, the lines of longitude 211, or the frame lines 210 on the solar panel.

Further, the image capturing unit 13 presets four effective view-finding coordinates before capturing an image, and then captures the image information within the scope of the four view-finding coordinates. The image capturing unit 13 can be, but not limited to, a camera. In a specific embodiment, a lens of the camera can be disposed toward the ground without limiting the present disclosure. In other embodiments, the lens of the camera can also be disposed at a constant angle of inclination. Without limitation, the lens of the camera can be specifically disposed as needed.

Without limitation, the image recognizing processing unit is preferably disposed on the vehicle body 10. After receiving the image information on the surface of the solar panel, the image recognizing processing unit captures the line information in the image information on the surface, and then compares the captured line information with predetermined frame-line data. If the captured line information is equal to or greater than the predetermined frame-line data, a frame line is regarded as being in an image, and thus the vehicle body 10 is judged to travel in the edge regions of the solar panel 200.

Further, in other embodiments, the captured line information includes at least one of line-width data and line-area data, and correspondingly, the predetermined frame-line data includes at least one of frame-line-width data and frame-line-area data.

Further, the image recognizing processing unit transforms the image into an image with black and white colors after receiving an image transmitted by the image capturing unit 13, and a line graph in the image is white. The black-and-white image transferring method includes, but is not limited to, a binary method.

Further, in other embodiments, whether there exists the frame line in the image is judged by the image recognizing processing unit to: compare width data or area data of a continuous white line in the image transformed with width data or area data in the predetermined frame-line data, and if width data of a captured line is equal to the width data in the predetermined frame-line data or if area data of the captured line is equal to or greater than the area data in the predetermined frame-line data, the vehicle body is regarded to travel on the edges of the solar panel.

For example, the predetermined frame-line-width data is 25, and the predetermined frame-line-area data is 25×75. Based on the above data, related data of the white line is compared with one or two of the two data, and then the frame line is judged according to a comparison result. The above values are merely for exemplary illustration without any limitation.

Further, in other embodiments, after judging the vehicle body 10 to travel on the edges of the solar panel 200, the image recognizing processing unit calculates distance data from a side border of the image to the frame line recognized, and compares the distance data calculated with a predetermined distance threshold. If the distance data calculated is greater than the predetermined distance threshold, the image recognizing processing unit instructs the vehicle body 10 to move toward the outside of the route until the distance data calculated is equal to the predetermined distance threshold. If the distance data calculated is less than the predetermined distance threshold, the image recognizing processing unit instructs the vehicle body 10 to move toward the inside of the route.

Further, in other embodiments, as the frame line 210 has a certain width, the distance threshold from a side edge of the captured image to the frame line 210 can be set by various methods. For example, the distance threshold can be determined as the distance from the side edge of the captured image to the nearest side edge of the frame line 210, or the distance threshold can be determined as the distance from the side edge of the captured image to the median line of the frame line 210, or the distance threshold can be determined as the distance from the side edge of the captured image to the furthest side edge of the frame line 210.

Further, in a preferred embodiment, the vehicle body 10 includes a housing 11. A travelling device 12 is disposed at two sides of the vehicle body 10 and is covered with the housing 11. An image captured by the image capturing unit 13 includes an image of the surface of the solar panel located between the housing 11 and the travelling device 12. Or in other words, the image capturing unit 13 is disposed between the travelling device 12 and the housing 11.

Further, in order to ensure the clarity of image information captured by the image capturing unit 13, an illuminating unit 14 is disposed on the vehicle body 10 and provides illuminating light for the image capturing unit 13. Specifically, the illuminating unit 14 can be disposed behind the image capturing unit 13. Without limitation, the illuminating unit 14 can be adopted in the form of a light-emitting diode (LED) lamp.

Figure 4:
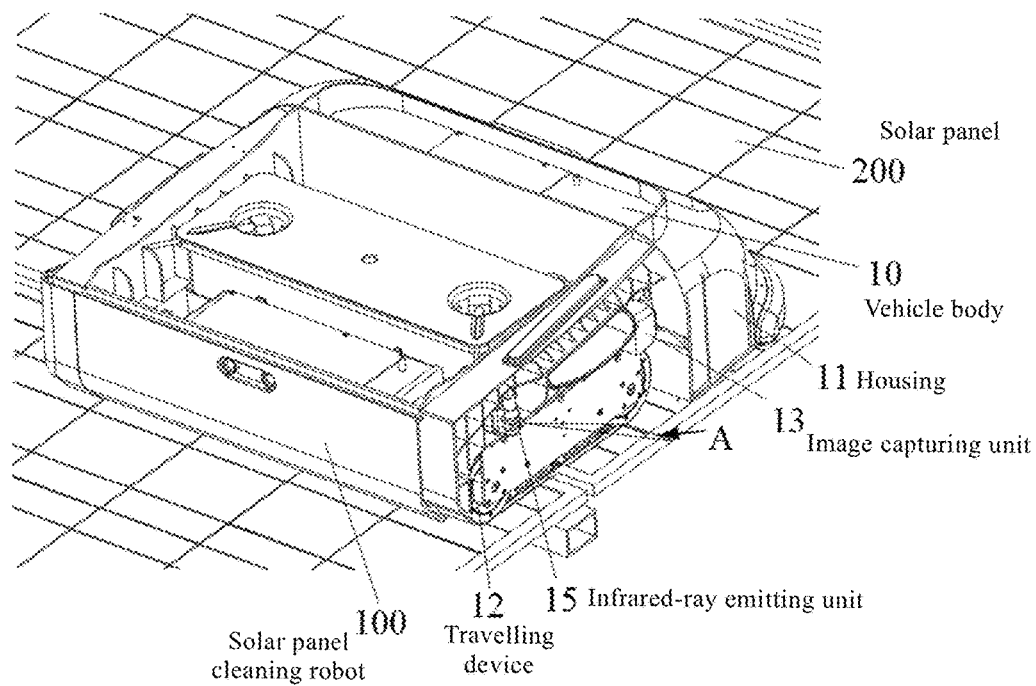
FIG. 4 is a schematic structural diagram of a cleaning robot located on a solar panel in another embodiment of the present disclosure and without illustrating a side housing of a vehicle body.

Please refer to FIG. 4, the present embodiment provides an edge-positioning apparatus for a solar panel cleaning robot 100. The solar panel cleaning robot 100 includes a vehicle body 10. The vehicle body 10 moves or stops on at least one solar panel 200.

The edge-positioning apparatus includes an infrared-ray emitting unit 15, an image capturing unit 13, and an image recognizing processing unit. An infrared ray A emitted from the infrared-ray emitting unit 15 illuminates the solar panel 200 on the route of the vehicle body 10 and has a certain length. The image capturing unit 13 is configured to capture an image of the surface of the solar panel 200 on the route of the vehicle body 10, and to transmit the captured image to the image recognizing processing unit of the edge-positioning apparatus. The infrared ray emitted from the infrared-ray emitting unit 15 and illuminating the surface of the solar panel 200 occurs in an image of the surface of the solar panel 200 captured by the image capturing unit 13.

The image capturing unit 13 can be, but not limited to, a camera. In a specific embodiment, a lens of the camera can be disposed toward the ground without limiting the present disclosure. In other embodiments, the lens of the camera can also be disposed at a constant angle of inclination. Without limitation, the lens of the camera can be specifically disposed as needed.

Without limitation, the image recognizing processing unit is preferably disposed on the vehicle body 10. After receiving the image information on the surface of the solar panel, the image recognizing processing unit captures length data of the infrared ray in the image information on the surface, and then compares the length data of the infrared ray with predetermined length threshold data. If the length data of the infrared ray is less than the predetermined length threshold data, the vehicle body 10 is regarded to travel in the edge regions of the solar panel 200.

Further, when judging a length of the infrared ray in a received image to be greater than the predetermined length threshold data, the image recognizing processing unit instructs the vehicle body 10 to move toward the outside of the route until the length of the infrared ray detected is equal to the predetermined length threshold data, preventing from omitting the cleaning of positions of opposite edges of the solar panel 200. When the length of the infrared ray detected is less than the predetermined length threshold data, the image recognizing processing unit instructs the vehicle body 10 to move toward the inside of the route, preventing the vehicle body 10 from falling from the edges of the solar panel 200.

Further, in a preferred embodiment, the vehicle body 10 includes a housing 11. A travelling device 12 is disposed at two sides of the vehicle body 10 and is covered with the housing 11. An image captured by the image capturing unit 13 includes an image of the surface of the solar panel located between the housing 11 and the travelling device 12. Or in other words, the image capturing unit 13 is disposed between the travelling device 12 and the housing 11. The infrared-ray emitting unit 15 is disposed behind the image capturing unit 13 and casts the infrared ray ahead at a constant angle of inclination.

Further, in order to ensure the clarity of image information captured by the image capturing unit 13, an illuminating unit 14 is disposed on the vehicle body 10 and provides illuminating light for the image capturing unit 13. Specifically, the illuminating unit 14 can be disposed behind the image capturing unit 13. Without limitation, the illuminating unit 14 can be adopted in the form of a light-emitting diode (LED) lamp.

Further, in another embodiment, the present disclosure provides an edge-positioning method for a solar panel cleaning robot 100, the method including a panel-image capturing step and an image analysis step. A solar panel 200 where the solar panel cleaning robot 100 is located is rectangular in shape. Four frame lines is disposed on edges of the solar panel. Lines of latitude and lines of longitude perpendicular to one another are disposed in the solar panel. A width of each frame line is greater than a width of each line of latitude and is greater than a width of each line of longitude. The panel-image capturing step includes capturing image information on a surface of the solar panel on a route of a vehicle body of the solar panel cleaning robot; and transmitting the image information on the surface to an image recognizing processing unit of the solar panel cleaning robot. The image analysis step includes capturing target-line information in the image information on the surface after the image recognizing processing unit receives the image information on the surface of the solar panel; comparing the captured target-line information with predetermined data; and then judging whether the vehicle body 10 travels in edge regions of the solar panel 200 according to a comparison result.

Further, in other embodiments, the captured image information on the surface of the solar panel 200 includes line information on the lines of latitude 212, the lines of longitude 211, or the frame lines 210. The captured target-line information is the captured line information in the image information on the surface. The captured line information is compared with predetermined frame-line data, and if the captured target-line information is equal to or greater than the predetermined frame-line data, a frame line is regarded as being in an image, and thus the vehicle body is judged to travel in the edge regions of the solar panel 200.

Further, in other embodiments, the captured line information includes at least one of line-width data and line-area data, and correspondingly, the predetermined frame-line data includes at least one of frame-line-width data and frame-line-area data.

Further, in other embodiments, the captured image information on the surface of the solar panel includes emitted light illuminating the solar panel. The emitted light is a target line. The edge-positioning method further includes fetching length data of the emitted light; and comparing the length data of the emitted light with predetermined length threshold data, and if the length data of the emitted light is less than the predetermined length threshold data, the vehicle body 10 is regarded to travel in the edge regions of the solar panel 200. Preferably, the emitted light can be, but not limited to, an infrared ray.

Further, in other embodiments, when judging a length of the emitted light in a received image of the surface to be greater than the predetermined length threshold data, the image recognizing processing unit instructs the vehicle body 10 to move toward the outside of the route until the length of the emitted light is equal to the predetermined length threshold data. When the length of the emitted light is less than the predetermined length threshold data, the image recognizing processing unit instructs the vehicle body 10 to move toward the inside of the route.

The present disclosure provides an edge-positioning apparatus for a solar panel cleaning robot and a positioning method thereof to effectively reduce the risk of the cleaning robot falling from a solar panel by comparing width, area, or length data of a recognized line in image information captured with predetermined frame-line data or a distance threshold or a length threshold, and determining whether the cleaning robot is located on the edges of the solar panel according to a comparison result. Therefore, an unnecessary loss of property can be prevented.

The above is only the preferred embodiment of the present disclosure. It should be noted that those skilled in the art, without departing from the principle of the present disclosure, can also make some improvements and modifications, these improvements and modifications should be deemed as the protection scope of the present disclosure.

What is claimed is:

1. An edge-positioning apparatus for a solar panel cleaning robot, the solar panel cleaning robot comprising a vehicle body configured to move or stop on at least one solar panel, the at least one solar panel being rectangular in shape, four frame lines being disposed on edges of the at least one solar panel, lines of latitude and lines of longitude perpendicular to one another being disposed in the at least one solar panel, a width of each frame line being greater than a width of each line of latitude and being greater than a width of each line of longitude, the edge-positioning apparatus comprising an image capturing unit and an image recognizing processing unit;

wherein the image capturing unit is disposed on the vehicle body and is configured to capture image information on a surface of the at least one solar panel on a route of the vehicle body, and to transmit the image information to the image recognizing processing unit; and wherein after receiving the image information on the surface of the at least one solar panel, the image recognizing processing unit captures target-line information, then compares the captured target-line information with predetermined data, and judges whether the vehicle body travels in edge regions of the at least one solar panel according to a comparison result.

2. The edge-positioning apparatus of claim 1, wherein the image information on the surface of the at least one solar panel comprises line information on the lines of latitude, the lines of longitude, or the frame lines;
   wherein the target-line information is the line information in the image information; and
   wherein the captured line information is compared with predetermined frame-line data, and if the captured target-line information is equal to or greater than the predetermined frame-line data, a frame line is regarded as being in an image, and thus the vehicle body is judged to travel in the edge regions of the at least one solar panel.

3. The edge-positioning apparatus of claim 2, wherein the captured line information comprises at least one of line-width data and line-area data, and the predetermined frame-line data comprises at least one of frame-line-width data and frame-line-area data.

4. The edge-positioning apparatus of claim 2, wherein the image recognizing processing unit transforms the image into an image with black and white colors after receiving an image transmitted by the image capturing unit, and a line graph in the image is white.

5. The edge-positioning apparatus of claim 4, wherein whether there exists the frame line in the image is judged by the image recognizing processing unit to:
   compare width data or area data of a continuous white line in the image transformed with width data or area data in the predetermined frame-line data, and if width data of a captured line is equal to the width data in the predetermined frame-line data or if area data of the captured line is equal to or greater than the area data in the predetermined frame-line data, the vehicle body is regarded to travel in the edge regions of the at least one solar panel.

6. The edge-positioning apparatus of claim 2, wherein after judging the vehicle body to travel in the edge regions of the at least one solar panel, the image recognizing processing unit calculates distance data from a side border of a captured image of the surface of the at least one solar panel to the frame line recognized, and compares the distance data calculated with a predetermined distance threshold;
   wherein if the distance data calculated is greater than the predetermined distance threshold, the image recognizing processing unit instructs the vehicle body to move toward the outside of the route until the distance data calculated is equal to the predetermined distance threshold; and
   wherein if the distance data calculated is less than the predetermined distance threshold, the image recognizing processing unit instructs the vehicle body to move toward the inside of the route.

7. The edge-positioning apparatus of claim 1, wherein the image capturing unit presets four view-finding coordinates before capturing an image, and then captures the image information on the surface of the at least one solar panel within the scope of the four view-finding coordinates.

8. The edge-positioning apparatus of claim 1, further comprising a light-emitting unit, wherein light emitted from the light-emitting unit occurs in an image of the surface of the at least one solar panel captured by the image capturing unit; and
   wherein the target-line information is length data of the emitted light in the image information received by the image recognizing processing unit, the image recognizing processing unit compares the length data of the emitted light with predetermined length threshold data, and if the length data of the emitted light is less than the predetermined length threshold data, the vehicle body is regarded to travel in the edge regions of the at least one solar panel.

9. The edge-positioning apparatus of claim 8, wherein when judging a length of the emitted light in a received image to be greater than the predetermined length threshold data, the image recognizing processing unit instructs the vehicle body to move toward the outside of the route until the length of the emitted light is equal to the predetermined length threshold data; and
   wherein when the length of the emitted light is less than the predetermined length threshold data, the image recognizing processing unit instructs the vehicle body to move toward the inside of the route.

10. The edge-positioning apparatus of claim 1, wherein an illuminating unit is disposed on the vehicle body and provides illuminating light for the image capturing unit.

11. The edge-positioning apparatus of claim 1, wherein the vehicle body comprises a housing, a travelling device is disposed at two sides of the vehicle body and is covered with the housing, and an image captured by the image capturing unit comprises an image of the surface of the at least one solar panel located between the housing and the travelling device.

12. The edge-positioning apparatus of claim 11, wherein the image capturing unit is disposed between the travelling device and the housing.

13. The edge-positioning apparatus of claim 1, wherein the image capturing unit comprises a camera whose a lens is disposed toward the ground.

14. An edge-positioning method for a solar panel cleaning robot, a solar panel where the solar panel cleaning robot is located being rectangular in shape, four frame lines being disposed on edges of the solar panel, lines of latitude and lines of longitude perpendicular to one another being disposed in the solar panel, a width of each frame line being greater than a width of each line of latitude and being greater than a width of each line of longitude, the edge-positioning method comprising:
   a panel-image capturing step, comprising capturing image information on a surface of the solar panel on a route of a vehicle body of the solar panel cleaning robot; and transmitting the image information on the surface to an image recognizing processing unit of the solar panel cleaning robot; and
   an image analysis step, comprising capturing target-line information in the image information on the surface after the image recognizing processing unit receives the image information on the surface of the solar panel; comparing the captured target-line information with predetermined data; and then judging whether the vehicle body travels in edge regions of the solar panel according to a comparison result.

15. The edge-positioning method of claim 14, wherein the captured image information on the surface of the solar panel comprises line information on the lines of latitude, the lines of longitude, or the frame lines;
   wherein the captured target-line information is the line information in the image information; and
   wherein the captured line information is compared with predetermined frame-line data, and if the captured target-line information is equal to or greater than the predetermined frame-line data, a frame line is regarded as being in an image of the surface, and thus the vehicle body is judged to travel in the edge regions of the solar panel.

16. The edge-positioning method of claim 15, wherein the captured line information comprises at least one of line-width data and line-area data, and the predetermined frame-line data comprises at least one of frame-line-width data and frame-line-area data.

17. The edge-positioning method of claim 14, wherein the captured image information on the surface of the solar panel comprises emitted light illuminating the solar panel, the emitted light is a target line, and the edge-positioning method further comprises:
   fetching length data of the emitted light; and
   comparing the length data of the emitted light with predetermined length threshold data, and if the length data of the emitted light is less than the predetermined length threshold data, the vehicle body is regarded to travel in the edge regions of the solar panel.

18. The edge-positioning method of claim 17, wherein when judging a length of the emitted light in a received image of the surface to be greater than the predetermined length threshold data, the image recognizing processing unit instructs the vehicle body to move toward the outside of the route until the length of the emitted light is equal to the predetermined length threshold data; and
   wherein when the length of the emitted light is less than the predetermined length threshold data, the image recognizing processing unit instructs the vehicle body to move toward the inside of the route.

* * * * *